July 25, 1967        R. M. J. PLACE        3,332,527

KEYBOARD FOR BRAILLER INCLUDING ALTERNATE KEYS

Filed Oct. 11, 1965

INVENTOR

RUTH M. J. PLACE

BY

ATTORNEYS

3,332,527
KEYBOARD FOR BRAILLER INCLUDING ALTERNATE KEYS
Ruth M. J. Place, 1139 N. Jenison, Lansing, Mich. 48915
Filed Oct. 11, 1965, Ser. No. 494,310
1 Claim. (Cl. 197—100)

The present invention relates to an improvement in braillers and more particularly to a new keyboard for a brailler allowing students and users to operate the brailler with one hand while freeing the other hand for reading.

A brailler is a device for embossing braille characters on relatively heavy paper stock. It is analogous in some respects to a typewriter. Each braille character is formed by the six elements of a three by two matrix or cell of positions, each of which position may or may not be raised into a small embossment or raised dot on the heavy paper stock. Each matrix of six dot positions can therefore be arranged to form $2^6=64$ distinct combinations of dots or bosses, more than enough to represent the 26 letters of the alphabet plus the ten numerical characters 0–9 and other signs. Brailler devices presently in use somewhat resemble typewriters, but, as seen in FIGURE 1, the keyboard comprises only six braille keys plus a spacer key (denoted by an S) arranged in a parallel line. Also included are two line spacer keys (denoted LS) at either side of the keyboard, and a back spacer (denoted BS). Each of the six braille keys corresponds to one of the six positions on the braille character matrix or cell. Thus any cell combination can be embossed onto the braille material by striking the appropriate combination of the braille keys.

Two hands are required to operate present braillers, an arrangement which proves to be very inconvenient. For example in copying, blind persons must first employ one hand to read and then relocate this hand to the brailler in order to reproduce the material read. Thus reading and writing cannot occur simultaneously as in ordinary typing where the reading is done visually. My invention proposes to eliminate this undesirable feature of repeatedly transferring one hand from the braille material to the keyboard, and then back again. I accomplish this by a new arrangement of the brailler keyboard which allows the keyboard to be operated by one hand, instead of requiring two hands as do the old brailler devices.

Accordingly it is an object of my invention to provide a brailler keyboard wherein the keys are arranged to be operable by a single hand (left or right), leaving the other hand free while brailling.

It is another object of my invention to provide a one-hand braille keyboard so as to enable a blind user to braille with one hand and simultaneously read braille copy with the free hand.

Figure 3:
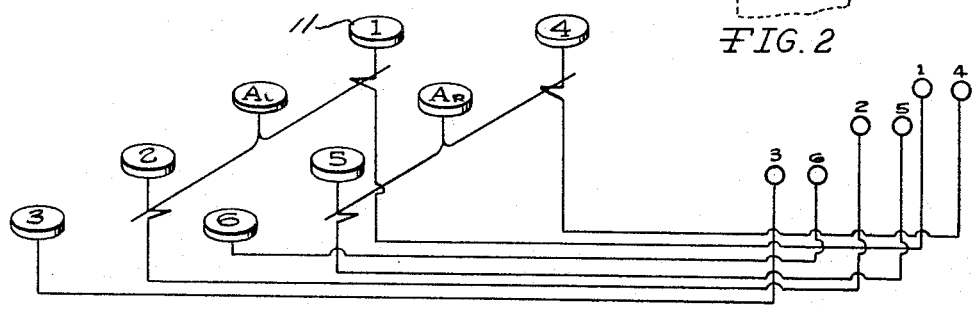

FIGURE 3 is a schematic perspective diagram of the brailler linkage of my invention, depicting the correspondence between each key and a position on the braille cell, and schematically showing the relation between the alternate keys and their pairs of associated brailling keys. This relation allows each of the keys to be depressed independently of each other, and if the alternate key is depressed the two adjacent brailler keys are simultaneously actuated.

Figure 4:
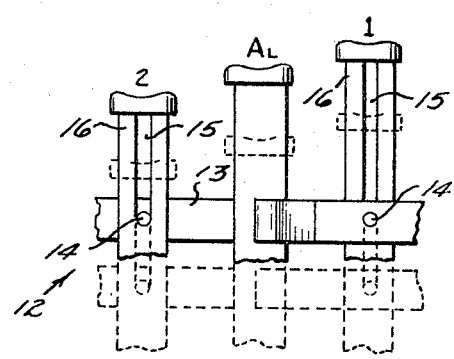

FIGURE 4 is a side elevation view of a specific mechanical structure for accomplishing the depression of two brailling keys by actuation of a single alternate key.

Figure 5:
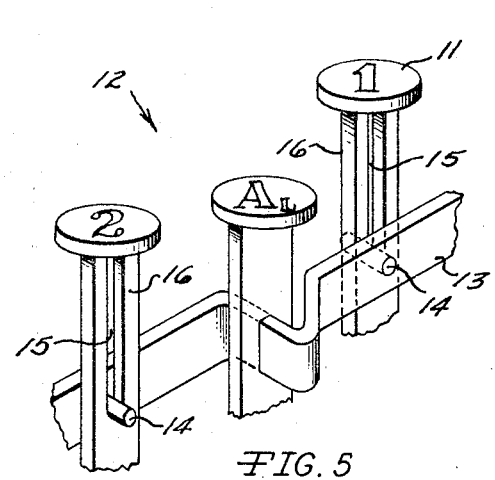

FIGURE 5 is a perspective partial view of an alternate key intermediate the two adjacent brailler keys.

Specification

In my invention eight keys 11 are provided, six of which are brailling keys numbered 1–6, the number on the key indicating the braille cell position to which the key corresponds. Thus depressing key number 6 would actuate a stylus which would impress a boss into position number 6 of a braille cell, which is the lower right hand position of the braille cell matrix. The remaining two keys in the set of keys 11, are marked $A_R$ and $A_L$. Of course these key markings are of utility only to seeing persons.

Figure 1:
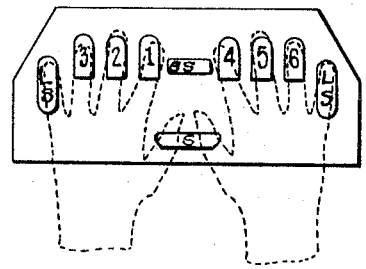
FIGURE 1 is a schematic diagram in plan view of the layout of the keys in braillers of the prior art, showing in phantom line the necessary placement of two hands at once upon the keyboard.

The six numbered keys function in the same way as the six brailling keys found on present braillers, as for example those shown in FIGURE 1. However, the keys of my invention differ from prior art keys in their arrangement on the keyboard for one hand operation.

The old arrangement shown in FIGURE 1, of a straight line layout of the keys made one hand operation so cumbersome as to be impractical. Of course, if a character were desired that required pressing all six keys at once, it would be impossible, in the prior art machines, to do so with one hand having only five fingers. In the keyboard of my invention shown in FIGURE 2 all five fingers can be conveniently utilized without undue contortion of the hand, arm, or body of the user. Moreover, either the left or right hand can be used, with the other hand free for some other activity.

My arrangement provides a spacer bar denoted by an S, and situated at the bottom of the keyboard. The spacer bar does not need to be integrated into the layout of the keys because it is not pressed in conjunction with any of the keys. Instead it is used alone when a space is desired. It can be pressed with the heel of the hand so that the fingers need not be removed from their position on the keys. This feature avoids a disorientation of the user with an attendant time delay in relocating the hand. Two line spacer keys (denoted LS) and a backspacer key (denoted BS) are also provided in convenient location.

The six manual brailling fleys 1–6 are arranged in a curvilinear configuration to conform to the general locus of the distal ends, or tips, of the digits on an outstretched human hand. The curve is symmetric (about an extension of the user's arm) and is formed as a compromise between a strictly left hand and strictly right hand shape. The disparity between the two shapes is sufficiently small that the single symmetric curve serves either hand very only one hand, all the keys being within the normal reach of a left or right hand. Thus the multiple punching of combinations of keys can be effectuated with one hand (right or left), leaving the other hand available for reading a braille text which is being copied or transcribed.

To obviate all unnecessary stretching or contortion of the hand or digits thereof, two alternate keys, denoted $A_L$ and $A_R$, are provided. Each alternate key permits for the depression of a pair of brailling keys by only one finger. Thus actuating alternate key $A_R$ will depress both brailling keys numbered 4 and 5. Similarly actuating alternate key $A_L$ will depress both adjacent brailling keys numbered 1 and 2. Inconvenient or impossible reaches are thereby avoided when several keys must be struck simultaneously. Furthermore this arrangement allows simultaneous depression of all six keys using only four fingers. The operation of these alternate keys is illustrated schematically in FIGURE 3. It is seen that any well known mechanical, pneumatic, hydraulic, electrical, or combination linkage may be used which allows keys 4 and 5 to be depressed independently of all other keys, but in which actuation of key $A_R$ will depress keys 4 and 5 simultaneously. The same is true with respect to alternate key $A_L$ and its associated brailler keys 1 and 2.

Figure 2:
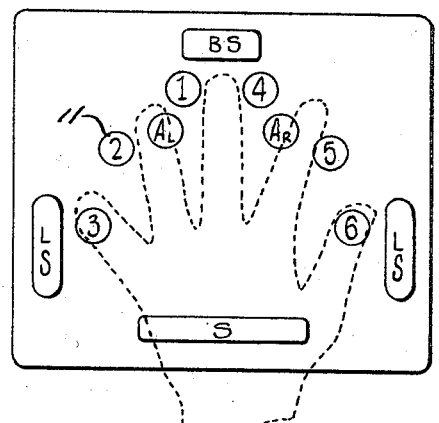
FIGURE 2 is a schematic diagram in plan view of the layout of the keys in my new brailler keyboard, showing in phantom line the accessibility of all the keys and space bars to the fingers of one hand.

The specific geometry of the brailling key arrangement is seen in FIGURE 2 to be a semi-circle. The alternate keys $A_L$ and $A_R$ are situated within the confines of the semi-circle defined by the arrangement of the brailling keys. Each alternate key is spaced an equal distance from each of the brailling keys with which it is associated. FIGURE 2 also depicts a circular shape for each individual key button. It is not absolutely essential that the key buttons be exactly geometrically circular. However, to best facilitate their semi-circular arrangement it is preferable that the key button shapes not be greatly elongate. Thus they need only be substantially regular geometric figures. Such regular figures may be inscribed in a circle and consequently are denoted herein as "circular."

By reference to FIGURE 4 and FIGURE 5 can be appreciated a specific linkage structure 12 for accomplishing the actuation of two brailling keys by operating a single alternate key. Depressing alternate key $A_L$ urges the crossbar 13 downward. Extending from either end of the crossbar 13 is a slot pin 14 which projects through the elongate slot 15 defined in the key post 16. When key $A_L$ is depressed the slot pins 14 immediately engage the lower ends of the slots 15 and carry the brailling keys 2 and 3 downward conjointly with the depressed alternate key $A_L$. However the slot pins 14 are sized to slide within the slot 15 so that when a brailler key 1 or 2 is depressed none of its motion is transmitted to the slot pin 14, and therefore actuation of any brailler key has no effect on any other keys. The depressed position of the braille keys 1 and 2, and key $A_L$, are shown in phantom line.

It should be understood that the particular structure illustrated here for alternate key operation is merely for revealing an operative embodiment and that any number of other arrangements well known in the art could be used. For example a ratchet mechanism could be employed.

Obvious substitutions, improvements, modifications, and variations of this invention will be apparent to those skilled in the art, and are within the scope of the invention which is limited only by the hereinafter appended claim.

What I propose to secure by Letters Patent and I claim is:

In a manual brailler keyboard of the type having brailler keys for the operation of punch dies, and alternate keys each of which is linked to an associated pair of adjacent brailler keys so that depression of said alternate key causes simultaneous actuation of both members of said associated brailling key pair, the improved keyboard arrangement which comprises:
  (a) six circular brailling keys evenly spaced apart to form a semi-circle, and accessible to the extended fingertips of a user's right or left hand; and
  (b) at least one alternate key disposed inside said brailling key semi-circle and equidistant from the pair of adjacent brailling keys associated with said alternate key.

References Cited

UNITED STATES PATENTS

| 329,675 | 11/1885 | Perkins | 197—6.1 |
| 521,397 | 6/1894 | Wait | 197—6.1 |
| 529,572 | 11/1894 | Wait | 197—6.1 |
| 578,785 | 3/1897 | Swindler | 197—6.1 |
| 940,255 | 11/1909 | Kehoe | 197—100 X |
| 2,031,017 | 2/1936 | Tevis | 197—100 X |
| 2,155,777 | 4/1939 | Steffen | 197—6.1 |

FOREIGN PATENTS 128,920   9/1920   Great Britain.

ROBERT E. PULFREY, *Primary Examiner.*

E. S. BURR, *Assistant Examiner.*